US012458586B2

(12) United States Patent
Gardikis

(10) Patent No.: US 12,458,586 B2
(45) Date of Patent: Nov. 4, 2025

(54) PREPARATION METHOD OF A COLLOIDAL SYSTEM OF STABILISATION AND CONTROLLED RELEASE OF ROYAL JELLY COMPONENTS FOR VARIOUS USES

(71) Applicant: APIVITA S.A., Markopoulo (GR)

(72) Inventor: Konstantinos Gardikis, Athens (GR)

(73) Assignee: APIVITA S.A., Markopoulo (GR)

(*) Notice: Subject to any disclaimer, the term of this patent is extended or adjusted under 35 U.S.C. 154(b) by 413 days.

(21) Appl. No.: 17/923,496

(22) PCT Filed: Oct. 29, 2020

(86) PCT No.: PCT/GR2020/000055
§ 371 (c)(1),
(2) Date: Nov. 4, 2022

(87) PCT Pub. No.: WO2021/240183
PCT Pub. Date: Dec. 2, 2021

(65) Prior Publication Data
US 2023/0190635 A1 Jun. 22, 2023

(30) Foreign Application Priority Data
May 27, 2020 (GR) .............................. 20200100283

(51) Int. Cl.
A61K 8/98 (2006.01)
A61K 8/04 (2006.01)
A61K 8/34 (2006.01)
A61K 8/73 (2006.01)

(52) U.S. Cl.
CPC ............... *A61K 8/988* (2013.01); *A61K 8/04* (2013.01); *A61K 8/345* (2013.01); *A61K 8/73* (2013.01)

(58) Field of Classification Search
CPC ................................. A61K 8/988; A61K 8/04
See application file for complete search history.

(56) References Cited

FOREIGN PATENT DOCUMENTS

| CN | 1323587 A | 11/2001 |
| CN | 104146298 B | 8/2015 |
| CN | 108653176 A | 10/2018 |
| JP | 2009-082016 A | 4/2009 |
| WO | 2017/089842 A1 | 6/2017 |
| WO | 2021/240183 A1 | 12/2021 |

OTHER PUBLICATIONS

Ramanathan et al., "A review on Royal Jelly proteins and peptides", Journal of Functional Foods 44 (2018), pp. 255-264.
Nagai et al., "Preparation and the functional properties of water extract and alkaline extract of royal jelly", Food Chemistry 84 (2004), pp. 181-186.
Sugiyama et al., "Royal Jelly Acid, 10-Hydroxy-trans-2-Decenoic Acid, as a Modulator of the Innate Immune Responses", Endocrine, Metabolic & Immune Disorders—Drug Targets, 12, (2012), pp. 368-376.
Ramadan et al., "Bioactive compounds and health-promoting properties of royal jelly: A review", Journal of Functional Foods 4 (2012), pp. 39-52.
Townsend et al., "Studies on the in Vitro Antitumor Activity of Fatty Acids I. 10-Hydroxy-2-decenoic Acid from Royal Jelly", Cancer Research vol. 20 (1960), pp. 503-510.
Blum et al., "10-Hydroxy-D2-Decenoic Acid, an Antibiotic Found in Royal Jelly", Science vol. 130, (1959), pp. 452-453.
Vucevic et al., "Fatty acids isolated from royal jelly modulate dendritic cell-mediated immune response in vitro", International Immunophamacology 7 (2007), pp. 1211-1220.
Fujii et al., "Augmentation of Wound Healing by Royal Jelly (RJ) in Streptozotocin-Diabetic Rats", Japan. J. Pharmacol. 53 (1990), pp. 331-337.
Koya-Miyata et al., "Identification of a Collagen Production-promoting Factor from an Extract of Royal Jelly and Its Possible Mechanism", Biosci. Biotechnol. Biochem., 68, (4), (2004), pp. 767-773.
Yang et al., "10-Hydroxy-2-decenoic acid from Royal jelly: A potential medicine for RA", Journal of Ethnopharmacology 128 (2010), pp. 314-321.
Dynek et al., "Microphthalmia-Associated Transcription Factor Is a Critical Transcriptional Regulator of Melanoma Inhibitor of Apoptosis in Melanomas", Cancer Res 68, 9 (2008), pp. 3124-3132.
Chen C et al., "Changes in protein components and storage stability of Royal Jelly under various conditions", Food Chemistry 54 (1995) pp. 195-200.
Sabatini et al., "Quality and standardisation of Royal Jelly", Journal of ApiProduct and ApiMedical Science 1(1), (2009), pp. 16-21.
Mendoza-Reséndez et al., "Synthesis of antibacterial silver-based nanodisks and dendritic structures mediated by royal jelly", RSC Adv., 4 (2014) pp. 1650-1658.
Dalfardi et al., "Protective and modulatory effects of royal jelly used against the induced changes in silver nanoparticles on the hippocampus of male rats", Nanomed. J. 6 (2), (2019), pp. 136-141.
József Szejtli, "Cyclodextrin Technology", Topics in Inclusion Science, Springer-Science+Business Media, B.V., (1988), pp. 322.
Koshio et al., "Aplicação Da Clae Para Determinação Do Ácido 10-Hidróxi-2-Decenóico (10-HDA) Em Geléia Real Pura E Adicionada a Mel Brasileiro", Quim. Nova, vol. 26, No. 5, (2003), pp. 670-673.

(Continued)

*Primary Examiner* — Terry A McKelvey
*Assistant Examiner* — Jacob A Boeckelman
(74) *Attorney, Agent, or Firm* — Oliff PLC

(57) ABSTRACT

Preparation method of a colloidal system of stabilisation and controlled release of royal jelly ingredients, wherein the said system is characterized by the extraction of the components of the royal jelly and the simultaneous encapsulation in combinatorial liposome—cyclodextrin carriers for achieving controlled release, taking advantage of the special features of both carriers, namely: the ability of cyclodextrins to encapsulate polyphenols and their enhanced skin penetration ability as well as the ability of liposomes in encapsulating large amounts of components of various degrees of polarity, for local component transport and for controlled release rate.

9 Claims, No Drawings

(56) References Cited

OTHER PUBLICATIONS

Jan. 21, 2021 International Search Report issued in PCT/GR2020/000055.
Jan. 21, 2021 Written Opinion issued in PCT/GR2020/000055.

PREPARATION METHOD OF A COLLOIDAL SYSTEM OF STABILISATION AND CONTROLLED RELEASE OF ROYAL JELLY COMPONENTS FOR VARIOUS USES

TECHNICAL FIELD

The present invention relates to a preparation method of a stable colloidal royal jelly dispersion system offering controlled release of its ingredients characterized in that the ingredients of royal jelly are extracted and simultaneously encapsulated in combinatorial liposome-cyclodextrin carriers showing controlled release of ingredients. The as prepared system is intended for cosmetic use as well as other uses either as such or incorporated in cosmetic or pharmaceutical form.

BACKGROUND AND PRIOR ART

Until now such a product or preparation method thereof has not been known. In particular royal jelly is a white viscous substance with a gel texture secreted by the hypopharyngeal glands of young workers bees. Owing to its excellent biological properties, royal jelly is widely used in the food, supplement, and cosmetics industry. Numerous studies have shown anti-aging, anti-inflammatory, antimicrobial, anticancer and antidiabetic properties. These activities are attributed primarily to the bioactive ingredients it contains (Ramanathana et al., 2018).

Royal jelly consists mainly of water (50-56%), proteins (18%), carbohydrates (15%), lipids (3%-6%), minerals (1.5%) and vitamins. Approximately 185 substances have been detected in royal jelly based on spectroscopic analysis. Principal bioactive substances are royalactin and 10-hydroxy-2-decenoic acid (10-HDA). Also substances such as adenosine monophosphate, acetylcholine, polyphenols and hormones such as testosterone, progesterone, prolactin and estradiol are detected in royal jelly samples and exhibit biological activity (Nagai et al., 2004; Sugiyama et al., 2012; Ramadan et al., 2012).

10-HDA is a major fatty acid in royal jelly. Since it is exclusively found in royal jelly it is an indicator of its quality, while demonstrating anti-cancer, antibacterial and immunoregulatory, anti-inflammatory, vaso-depressor properties (Townsend et al., 1961; Blum et al., 1959, Vucevic et al., 2007). Regarding the skin, it appears that there are indications for collagen synthesis enhancement and indications for inhibiting the synthesis of metalloproteinases, fact that makes it an interesting molecule for anti-aging use (Fujii et al., 1990; Koya-Miyata et al., 2004; Yang et al., 2010). Furthermore, it is an effective tyrosinase inhibitor imparting skin whitening properties (Dynek et al., 2008).

Polyphenols are also important bioactive molecules, with antioxidant and photoprotective skin activity.

Royal jelly exhibits significant issues of physicochemical stability depending on time and storage temperature. Ideal storage temperature of royal jelly is −20° C. while higher temperatures cause colour change and component degradation due to the Maillard reaction, enzymatic reactions, and lipid-protein reactions (Chen C et al., 1995).

For minimising the occurrence of such degradation the royal jelly should be stored in dark containers and in cold storage (Sabatini et al., 2009).

For the avoidance of the degradation of royal jelly several technical developments are used such as lyophilization or encapsulation (CN1323587A patent).

Other technical developments where the use of royal jelly has been investigated are nanoparticle coating and dendritic structures for antimicrobial use (Mendoza-Reséndez, 2014) as well as the protective activity that it can induce in silver nanoparticles of their toxic effect on the hippocampus (Dalfardi et al., 2019).

The above technical developments do not specifically refer to the dermatological use of royal jelly, which presents some challenges. Besides that fact that the royal jelly should be in a state that allows on one hand the dispersion of its ingredients in cosmetic forms as well as the protection of sensitive components from degradation, there should be ensured such a duration of contact of the components of the royal jelly with the target cells so that its activity on the skin can be achieved.

It is known from literature that the formation of encapsulation complexes of bioactive substances in cyclodextrins provides advantages such as the increase of solubility in water, the protection against oxidation and the protection against degradation of molecules. Cyclodextrin has been used for the encapsulation of royal jelly with subsequent lyophilization to increase its stability (Szejtli, 1988).

Liposomes are also standard encapsulation structures of bioactive substances with the aim of altering the solubility, the protection against degradation, the uptake of substances into deeper layers of the skin and the alteration of the release rate of encapsulated substances.

The combination of the above carriers into one single system can offer the combined advantages of the two carriers, as described in the patent of our laboratory for the creation of a preparation method and the stabilization of a colloidal propolis system that demonstrates controlled release (WO2017089842A1 patent).

The present invention aims to eliminate the stability disadvantages of royal jelly, but also to the controlled release of its ingredients and more particular 10-HDA and the polyphenols that it contains. In particular, in the present invention is carried out, for the first time, the simultaneous extraction and encapsulation of the royal jelly components in a combinatorial liposome-cyclodextrin system, which consists exclusively of natural and safe ingredients and which exhibit controlled release of the encapsulated polyphenols and 10-HDA.

More specifically, the present invention exploits the special features of both carriers, namely: the ability of cyclodextrins to encapsulate polyphenols and their enhanced skin penetration ability as well as the ability of liposomes to encapsulate large amounts of components of various degrees of polarity, for local transport of components and for controlled release rate. More specifically liposomes are used for the encapsulation of 10-HDA owing to its physicochemical affinity with the fat chains of liposome phospholipids. The extraction and encapsulation process of the components of RJ into the combinatorial system takes place in one single container.

The purpose of the present invention is to prepare a stable colloidal system of royal jelly dispersion with an innovative method where the components of the royal jelly are extracted and simultaneously encapsulated in liposome-cyclodextrin carriers. The system when found in suitable conditions, exhibits controlled release of ingredients while the encapsulated components are preserved and protected into the combinatorial system via proper storage conditions. The final composition is suitable for dermatological and other uses, taking advantage of bioactive properties of polyphenols and 10-HDA either as such or after incorporation into cosmetic or pharmaceutical forms.

The advantages and novel features of the method are the following:

- It is a particularly simple method of production of a complex combinatorial royal jelly delivery system with a very simple method of preparation. The procedure of formation of the inclusion complexes, between hydroxypropyl-β-cyclodextrin or β-cyclodextrin and the active components of royal jelly, as well as the encapsulation of royal jelly in liposomes, either in free form or in the form of a complex with cyclodextrin, is performed during the extraction in a single container.
- The time required for the formation of the colloid is short and the energy supply is minimal, thus the final production cost is retained proportionally at very low levels.
- The simultaneous extraction by means of specific different carriers (liposomes and cyclodextrins) offers a very high yield of extraction of polyphenols and 10-HDA. The encapsulation efficiency of the system of polyphenols is >95% and of 10-HAD>85%.
- The interaction of the two carriers with polyphenols and 10-HDA offers controlled and even prolonged release of the components of royal jelly under suitable conditions. Under storage conditions the components remain protected in their interior.
- The combination of components and the lipid composition of the liposomes are such so as to avoid fusion and aggregation issues of the liposomes which result in a system of excellent stability both from physicochemical point of view (mean hydrodynamic diameter, z-potential, polydispersity index, pH) and in terms of polyphenol retention and royal jelly in the inside of the liposomes during storage.
- Only safe and compatible to the skin and mucosa components are used.
- The final extract is titrated to total polyphenols and 10-HDA.
- The colloidal system is self-sustaining for a period of 1 year in temperature 5-7° C. and does not require the addition of preservatives, despite its large water content. This is due to the extremely high content in polyphenols which exhibit antimicrobial properties.
- The components of the colloidal system are protected against oxidation or degradation caused by light and increase in temperature, due to the double encapsulation in liposomes and cyclodextrins. In addition, for the same reason are also protected from interaction with other components in case the colloidal system is used as a component in cosmetic or pharmaceutical formulations.
- The colloidal system may be used directly on human skin and mucosa or can be incorporated into cosmetic or pharmaceutical formulations for topical or systemic administration. In cosmetic or pharmaceutical formulations, in fact, it provides transparent liquids if required e.g. in the manufacture of gels.
- The colloidal system may be used with appropriate formation as dietary supplement, pharmaceutical formulation, nutraceutical and as a functional food.

INVENTION DISCLOSURE

In order for our invention to be fully understood by those skilled in the art, we then proceed to the detailed description of the preparation method of the system of dispersion of fresh royal jelly in combinatorial liposome/cyclodextrin carriers.

In order for the system to be prepared, the fresh royal jelly, maintained at 5-7° C., is left to reach room temperature for the shortest time possible. Minimum requirement of the concentration of hydroxydecenoic acid (10-HDA) in the royal jelly is >1.8% w/w, as determined by the method of Koshio et al.

The royal jelly is then gradually dissolved under stirring in a solvent system consisting of deionized water and either vegetable 1,3-propanediol or glycerol or vegetable butylene glycol in a ratio of 1,3-propanediol (or glycerol or butylene glycol)/water: 5/95 to 90/10. The concentration of royal jelly in the solvent system ranges between 0.5% to 6.0% w/w. Hydroxypropyl-β-cyclodextrin or β-cyclodextrin or γ-cyclodextrin is pre-dissolved in deionized water at a concentration of 1%-22% w/w.

The system royal jelly/cyclodextrin/solvent system is subjected to stirring (1000-3000 rpm) for 30-90 min and at a temperature of 20° C. to 26° C.

The quality requirement of deionized water is: <=1 μS/cm at 25° C., which meats the specification of European Pharmacopoeia for the preparation of parenteric pharmaceutical products. This quality requirement is necessary for the complete absence of charges in the final formulation that could cause the lipid membranes of the liposomes to agglomerate and eventually to a reduced product stability.

The preparation of deionized water to be used in our invention is as follows:

Water from the water supply system is introduced into the raw water tank (volume 2 m$^3$), with a suitable pumping unit, it passes through an automatic turbidity filter to remove the turbidity and the solid particles and activated carbon to remove chlorine and organic charge and then a scale inhibitor is dosed to remove its hardness. Before its introduction to the main unit of reverse osmosis unit, it passes through a 1 micron cartridge filter.

Fully treated water for use in reverse osmosis is introduced in the reverse osmosis unit of 350 lt/h capacity with 70% recovery. The water produced from the unit is tanked in a stainless steel tank, of 5 m$^3$ volume. From this tank, water is supplied with a suitable pumping unit, to the deionizer and is driven on-line to the extraction tank via UV radiation. To avoid stagnant water in the network, water is under continuous recirculation with return to the tank.

The preparation of the liposomal system takes place in a separate container. The liposomal system consists of 50%-95% Phosphatidylcholine, 2%-10% Phosphatidylethanolamine, 0%-3% Lysophosphatidylcholine, 0%-3% Phosphatidylinositol, 0%-3% Phosphatidic acid, 0%-22% cholesterol and 0-17% bile salts, in solvent 1,3-propanediol or glycerol. The ratio of the above components to 1,3-propanediol or glycerol range from 20/80 to 80/20% w/w. Then, the system royal jelly/cyclodextrin/solvent system is added into the liposomal system at a rate of 10 ml/sec in a ratio of 1.0-7.5% w/w. After complete addition, the system pH is adjusted in the range between 5.0-8.2 and either Disodium Ethylenediaminetetraacetic acid or Tetrasodium Glutamate Diacetate is added at a concentration of 0.1-0.2% w/w. The system is stirred at 4000 rpm for 4 hours.

The mixture is then left in a hermetically sealed container at 5-7° C. for 24 hours. The colloidal system is then subjected to cold filtration through an array cartridge filters of pore size 5 μm-1 μm-0.45 μm and the pH is retested which if necessary is readjusted in the range 5.0-8.2.

The system is then allowed to reach room temperature and the mean hydrodynamic particles diameter is measured which should range between 220 nm to 650 nm with a polydispersity index ranging from 0.25 to 0.68. In case the measured values are out of limits, a second filtration, at room temperature, through an array of cartridge filters with pore size 0.45 μm-0.2 μm follows.

Once the values of mean hydrodynamic diameter and polydispersity index are within the specifications the total content of polyphenols and total 10-HDA content in the system are assessed.

Consequently the release rate of polyphenols and 10-HDA is determined in a buffer at pH 7.2 at 37° C. and the colloidal system is stored in a dark container at a temperature of 5-7° C., where it remains stable for 1 year.

Based on the method described above in order for the invented system to be suitable for its intended use, the total content in polyphenols should be greater than 200 mg/L GAE while the total content in 10-HDA should be greater than 0.04% w/w.

The release of polyphenols (cumulative release) at a pH of 7.2 and at temperature of 37° C. is 25%-75% in 8 hours while the system releases practically all encapsulated polyphenols in 24 hours. The respective values for 10-HDA are 40%-80% in 8 hours while the system releases practically the total amount of encapsulated 10-HDA in 12 hours.

In order to make the present invention, fully understood, we proceed to following examples:

Example 1

RJ after reaching ambient temperature is dispersed in a concentration of 2% to a solvent system comprised of water and vegetable 1,3-propanediol in a ratio of 1,3-propanediol/water: 50/50. In the aqueous phase hydroxypropyl-β-cyclodextrin is pre-dissolved at a concentration of 9%.

As the system is under intense stirring (3000 rpm) and at temperature of 20° C. the liposomal suspension is added at a per weight concentration of 3.0%. The procedure follows as described in the disclosure of the invention.

The final colloidal suspension after the filtration exhibit the values shown in Table 1.

TABLE 1

| Parameter | Value |
| --- | --- |
| Mean particle hydrodynamic diameter | 120-250 nm |
| Polydispersity index | <0.68 |
| 10-HDA | 0.05% w/w |
| Total polyphenols (gallic acid equivalents) | 350 mg/L |
| Cummulative release of 10-HDA in 8 hours % | 65-75 |
| Cummulative release of polyphenols in 8 hours % | 42-60 |

Example 2

RJ after reaching ambient temperature is dispersed in a concentration of 5% to a solvent system comprised of water and vegetable 1,3-propanediol in a ratio of 1,3-propanediol/water: 75/25. In the aqueous phase, hydroxypropyl-β-cyclodextrin is pre-dissolved at a concentration of 12%.

As the system is under intense stirring (3000 rpm) and at temperature of 20° C. the liposomal suspension is added at a per weight concentration of 3.5%. The procedure follows as described in the disclosure of the invention.

The final colloidal suspension after the filtration exhibit the values shown in Table 1.

TABLE 1

| Parameter | Value |
| --- | --- |
| Mean particle hydrodynamic diameter | 120-250 nm |
| Polydispersity index | <0.68 |
| 10-HDA | 0.08% w/w |
| Total polyphenols (gallic acid equivalents) | 430 mg/L |
| Cummulative release of 10-HDA in 8 hours % | 60-75 |
| Cummulative release of polyphenols in 8 hours % | 40-65 |

Determination of mean hydrodynamic diameter and Polydispersity index is performed via Dynamic Light Scattering.

REFERENCES CITED IN THE DESCRIPTION

Ramanathana A. N. K. G., Nair A. J., Sugunan V. C, A review on Royal Jelly proteins and peptides, Journal of Functional Foods, 44, 2018, 255-264 5

Nagai T., Inoue R. Preparation and the functional properties of water extract and alkaline extract of royal jelly. Food Chemistry. 2004; 84 (2): 181-186

Sugiyama T., Takahashi K., Mori H. Royal jelly acid, 10-hydroxy-trans-2-decenoic 10 acid, as a modulator of the innate immune responses. Endocrine, Metabolic & Immune Disorders-Drug Targets. 2012; 12 (4): 368-376\

Ramadan M. F., Al-Ghamdi A. Bioactive compounds and health-promoting properties of royal jelly: a review. Journal of Functional Foods, 4, 1, 2012, 39-52 15

Townsend G. F, Brown W. H, Felauer E. E, Hazlett B. Studies on the in vitro antitumor activity of fatty acids. IV. The esters of acids closely related to 10-hydroxy-2-decenoic acids from royal jelly against transplantable mouse leukemia. Can J Biochem Physiol. 1961; 39:1765-1770 20

Blum M. S, Novak A. F, Taber S. 10-Hydroxy-24-decenoic acid, an antibiotic found in royal jelly. Sci. 1959; 130: 452-453

Vucevic D, Melliou E, Vasilijic S, Gasic S, Ivanovski P, Chinou I, Colic M. Fatty acids 25 isolated from royal jelly modulate dendritic cell-mediated immune response in vitro. Int Immunopharmacol. 2007; 7:1211-1220

Fujii A. Kobayashi S. Kuboyama N, et al. Augmentation of wound healing by royal jelly (RJ) in streptozotocin-diabetic rats. Jpn J Pharmacol. 1990; 53:331-337 30

Koya-Miyata S. Okamoto I. Ushio S. Iwaki K. Ikeda M. Kurimoto M. Identification of a collagen production-promoting factor from an extract of royal jelly and its possible mechanism. Biosci Biotechnol Biochem. 2004; 68:767-773 11

Yang X. Y., Yang D. S., Wei-Zhang, et al. 10-Hydroxy-2-decenoic acid from Royal jelly: A potential medicine for RA. J Ethnopharmacol. 2010; 128:314-321

Dynek J. N, Chan S. M, Liu J, Zha J, Fairbrother W. J, Vucic D. Microphthalmia-5 associated transcription factor is a critical transcriptional regulator of melanoma inhibitor of apoptosis in melanomas. Cancer Res. 2008; 68:3124-3132

Chen C., Chen S. Y., Changes in protein components and storage stability of Royal Jelly under various conditions, Food Chemistry, 54, 2, 1995, 195-200

Sabatini, A. G., Marcazzan, G. L., Caboni, M. F., Bogdanov, S., Almeida-Muradian, L. B. (2009): Quality and standardisation of Royal Jelly. J. ApiProd. ApiMed. Sci. 1 (1), 1-6.

Mendoza-Reséndez R., Treviño A. G., Castro E. D. B et al., Synthesis of Antibacterial Silver-based Nanodisks and Dendritic Structures Mediated by Royal 15 Jelly, RSC Advances 4 (4), 2014, 1650

Dalfardi M., Taghavi M. M., Kohbanani M., S. et al., Protective and modulatory effects of royal jelly used against the induced changes in silver nanoparticles on the hippocampus of male rats, Nanomedicine Journal, 6, 2, 2019, 136-141 Szejtli, J., Cyclodextrin technology, 1988, pp. 322

Koshio S., Almeida-Muradian L., HPLC aplication for 10-HDA determination in pure royal jelly and honey with royal jelly, Química Nova 26 (5), 2003, 670-673

The invention claimed is:

1. A preparation method of a colloidal stabilization system and controlled release of royal jelly components, comprising:

in a first stage fresh royal jelly is kept in a temperature of 5-7° C. and contains 10-hydroxydecenoic acid in a concentration of >1.8% w/w and is then allowed to reach room temperature;

in a second stage the fresh royal jelly is gradually dissolved, under stirring in a system of solvents which consists of deionized water, in which hydroxypropyl-β-cyclodextrin or β-cyclodextrin or γ-cyclodextrin in a concentration of 1%-22% w/w has been pre-dissolved and either vegetable 1,3-propanediol or glycerol or vegetable butylene glycol in a ratio of vegetable 1,3-propanediol or glycerol or vegetable butylene glycol to water of from 5/95 to 90/10, where the concentration of royal jelly in the solvent system ranges between 0.5% to 6.0% w/w;

in a third stage the system of royal jelly/cyclodextrin/solvent system is subjected to stirring at 1000 to 3000 rpm for 30 to 90 minutes at a temperature of 20° C. to 26° C.;

in a fourth stage, the system royal jelly/cyclodextrin/solvent is added to a liposomal system at a rate of 10 ml/sec at a concentration of 1.0-7.5% w/w, after complete addition of which a pH of the system is set in a range 5.0-8.2 and either Disodium Ethylenediaminetetraacetic acid or Tetrasodium Glutamate Diacetate is added at a concentration of 0.1-0.2% w/w the system subjected to stirring at 4000 rpm for 4 hours, to form a mixture;

in a fifth stage, the mixture is kept in a hermetically sealed container to rest for 24 hours at 5-7° C. and then, the colloidal system is cold filtered through an array of cartridge filters of pore size 5 μm-1 μm-0.45 μm and the pH is retested, and the pH is readjusted to be in the range of 5.0-8.2 if the pH outside the range of 5.0-8.2;

in a sixth stage, the system is allowed to reach room temperature and a mean hydrodynamic particles diameter is measured which should range between 220 nm to 650 nm with a polydispersity index ranging from 0.25 to 0.68, wherein if the measured mean hydrodynamic particles diameter or polydispersity index values are out of these ranges, the colloidal system is filtered through an array of cartridge filters with pore size 0.45 μm-0.2 μm at room temperature; and in a final stage, after finding that the mean hydrodynamic diameter is between 220 nm to 650 nm and the polydispersity index is from 0.25 to 0.68, a total content of polyphenols and total content of 10-hydroxydecenoate acid are measured, while continuously a release rate of polyphenols and 10-hydroxydecenoic acid is measured in a buffer at pH 7.2 at 37° C. and the colloidal system is stored in a dark container at a temperature of 5-7° C., and is stable for 1 year.

2. A preparation method of a colloidal stabilization system and controlled release of royal jelly ingredients according to claim 1 wherein the deionized water quality is: ≤1 μS/cm at 25° C.

3. A preparation method of a colloidal stabilization system and controlled release of royal jelly ingredients according to claim 1, wherein the deionized water is produced by introducing water of a water supply network into a tank with a pumping unit, passing the water through an automatic turbidity and activated carbon filter, and then a scale inhibitor is dosed to remove water hardness, and then the water enters a main unit of a reverse osmosis unit, of 350 lt/h capacity with 70% recovery after having passed first, through a 1 micron cartridge filter and the water is then tanked in a stainless steel tank, from which the water supplies a deionizer.

4. A preparation method of a colloidal stabilization system and controlled release of royal jelly ingredients according to claim 1, wherein the liposomal system, which consists of 50%-95% Phosphatidylcholine, 2%-10% Phosphatidylethanolamine, 0%-3% Lysophosphatidylcholine, 0%-3% Phosphatidylinositol, 0%-3% Phosphatidate acid, 0%-22% cholesterol, 0-17% bile salts, is performed, in solvent 1.3-propanediol or glycerol, in a concentration ranging from 20/80 to 80/20% w/w, is produced in a container.

5. A preparation method of a colloidal stabilization system and controlled release of royal jelly ingredients according to claim 1, wherein the total content of polyphenols in the system is greater than 200 mg/L GAE.

6. A preparation method of colloidal stabilization system and controlled release of royal jelly ingredients according to claim 1, wherein the total content of 10-hydroxydecenoic acid in the system is greater than 0.04% w/w.

7. A preparation method of colloidal stabilization system and controlled release of royal jelly ingredients according to claim 1, wherein a cumulative release of polyphenols at pH 7.2 and temperature 37° C. is 25-75% in 8 hours with total release of encapsulated polyphenols from the system at 24 hours.

8. A preparation method of colloidal stabilization system and controlled release of royal jelly ingredients according to claim 1, wherein a cumulative release of 10-hydroxydecenoate acid at pH 7.2 and 37° C. is 40%-80% in 8 hours with total release of encapsulated 10-hydroxydecenoic acid from the system in 12 hours.

9. A stable colloidal dispersion system of royal jelly that releases in a controlled manner its components which is produced according to the method of claim 1, wherein its total content of polyphenols is greater than 200 mg/L GAE, its total content of 10-hydroxydecenoic acid is greater than 0.04% w/w, wherein a cumulative release of polyphenols at pH 7.2 and temperature 37° C. ranges from 25% to 75% in 8 hours with total release taking place in 24 hours, and wherein a cumulative release of 10-hydroxydecenoic acid is 40% up to 80% in 8 hours with total release taking place in 12 hours.

* * * * *